May 2, 1933.  B. W. TIMONEY  1,907,411
SURFACE TREATING APPARATUS
Filed March 22, 1930  4 Sheets-Sheet 1
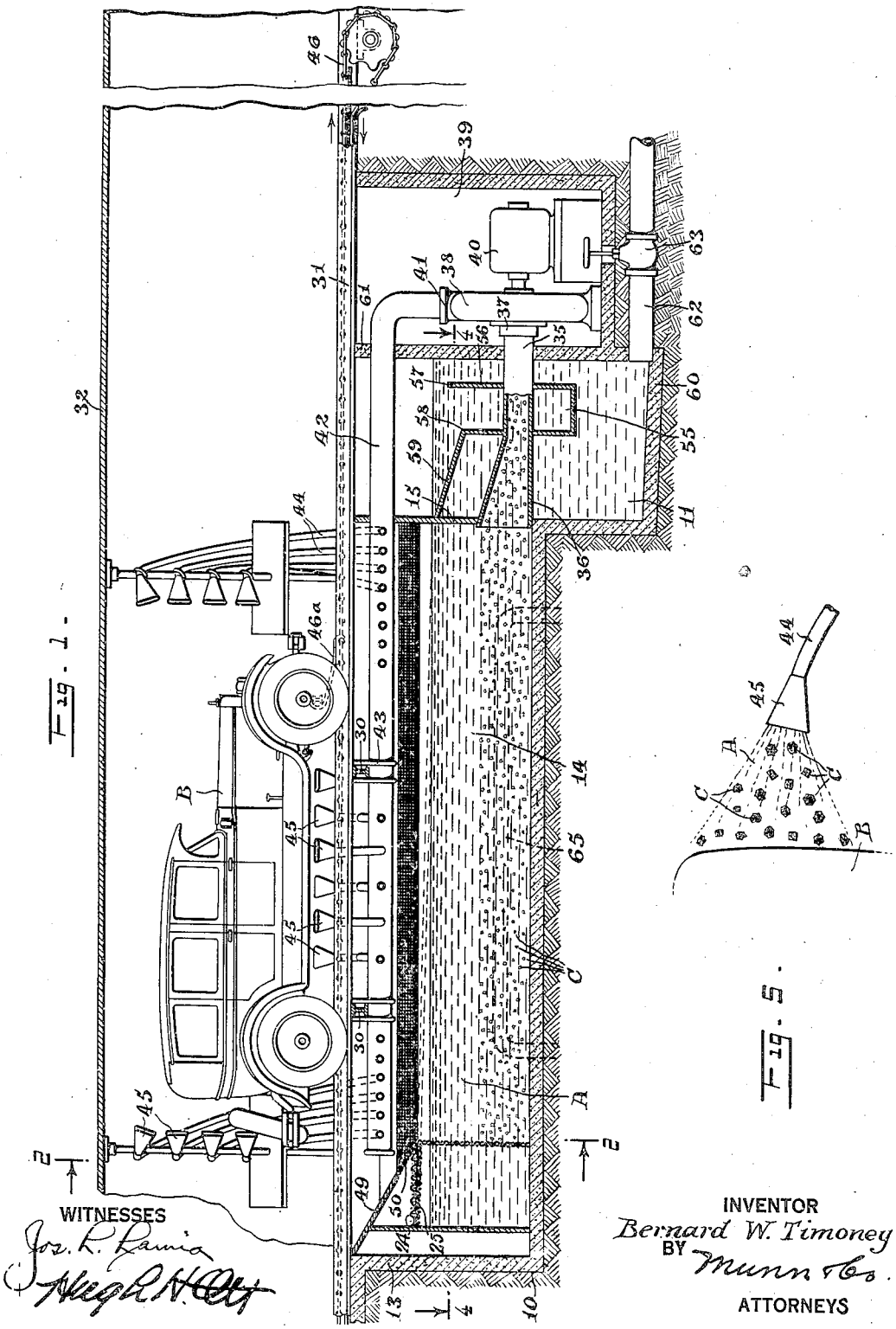
INVENTOR
Bernard W. Timoney
BY Munn & Co.
ATTORNEYS

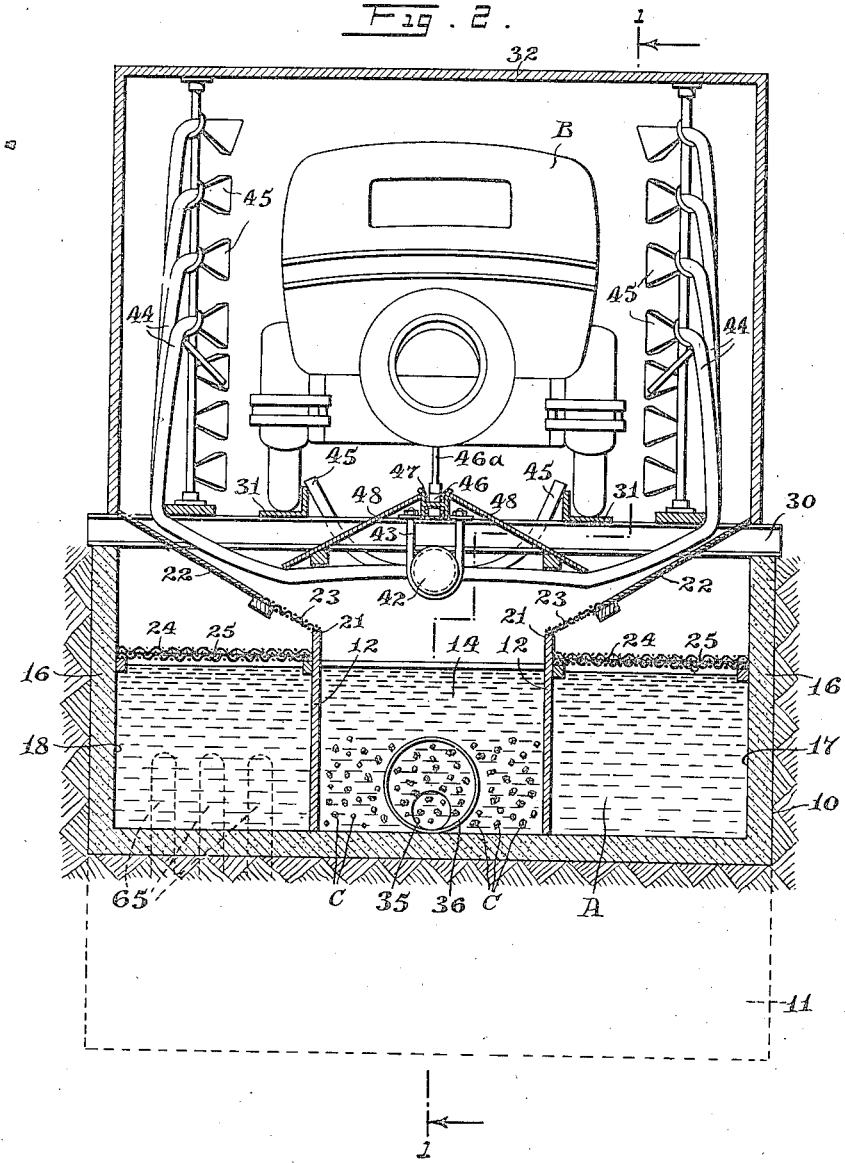

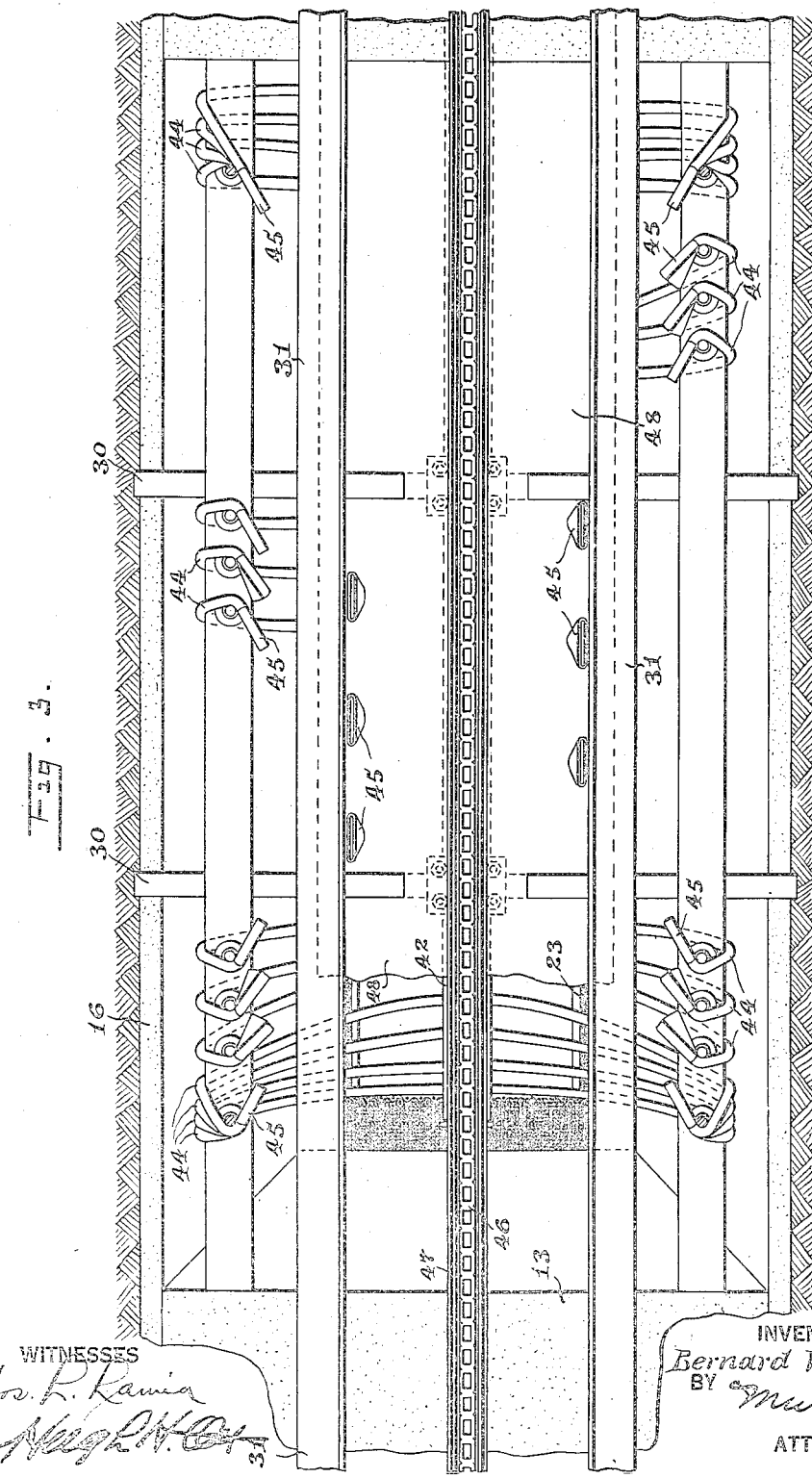

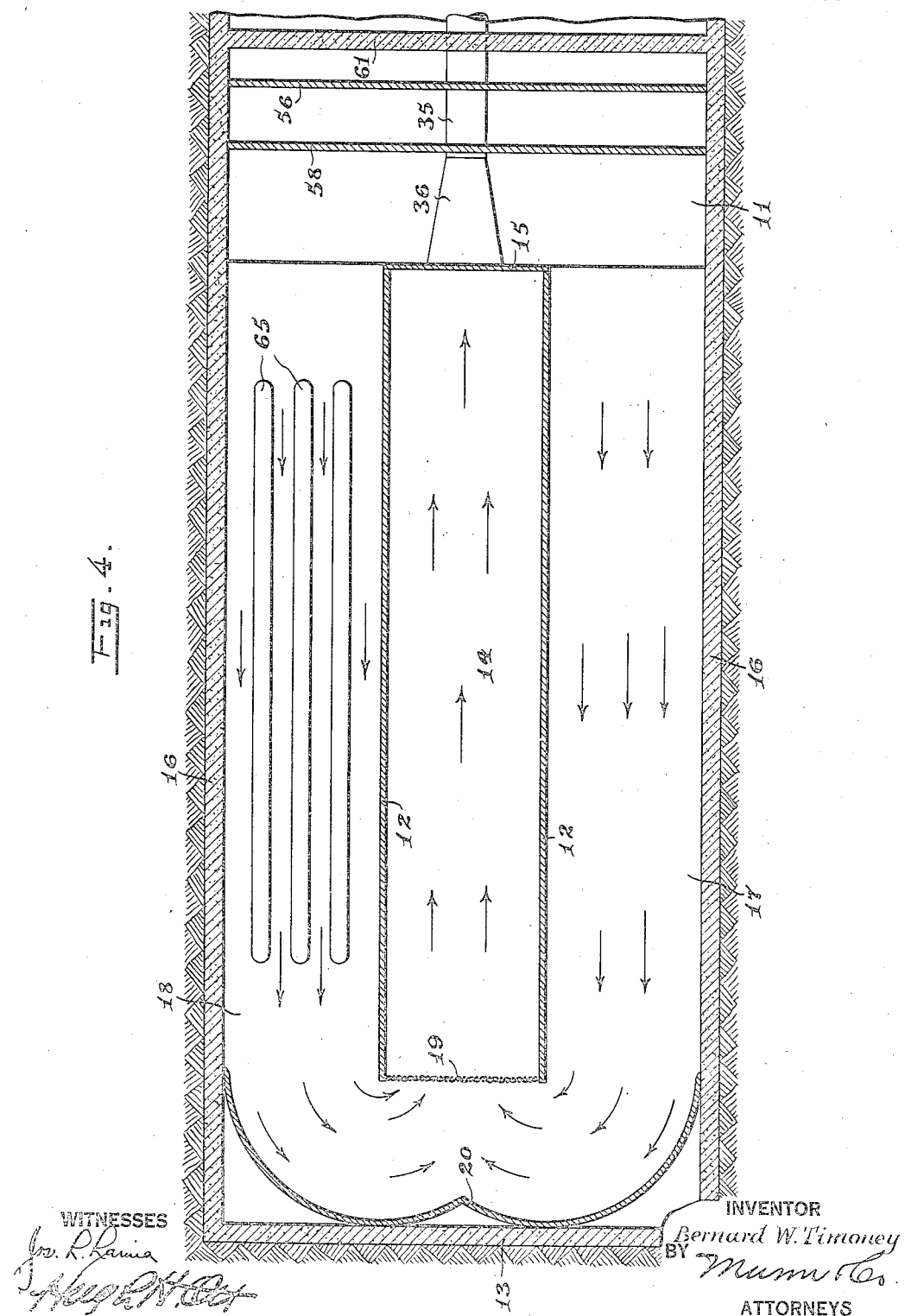

Patented May 2, 1933

1,907,411

UNITED STATES PATENT OFFICE

BERNARD W. TIMONEY, OF JACKSON HEIGHTS, NEW YORK; JANE TIMONEY ADMINISTRATRIX OF SAID BERNARD W. TIMONEY, DECEASED

SURFACE TREATING APPARATUS

Application filed March 22, 1930. Serial No. 438,173.

This invention relates to an apparatus for treating surfaces, and has more particular reference to means for washing and cleansing various surfaces.

In its broad aspect, the invention comprehends a fluid containing a relatively solid substance, which fluid and substance are simultaneously projected against surfaces to be treated.

The invention more specifically contemplates a cleansing or washing fluid containing a plurality of relatively solid soft projectiles, such as sponges or their equivalent, which projectiles are forcibly discharged by and with the fluid against the surfaces to be washed, cleansed or otherwise treated, whereby the projectiles function in combination with the fluid to act upon and remove the foreign matter from the surface.

As a further object, the invention resides in an apparatus for cleansing and washing surfaces which embodies a reservoir containing a washing or cleansing fluid and a multiplicity of relatively solid soft projectiles, together with means for withdrawing and projecting a stream of the projectile laden fluid against the surface to be washed and cleansed, whereby the projectiles set up in effect a rubbing or buffing action to remove the dust, dirt, grease or other foreign matter.

As a still further object, the apparatus embodies means for separating the projectiles from the cleansing fluid after contact with the surface or surfaces being washed and cleansed, together with means for returning the projectiles directly to the reservoir and means for separating the dust, dirt or other foreign matter from the cleansing fluid and then returning the cleansing fluid to the reservoir for re-use.

Other objects of the invention reside in the provision of an improved apparatus for washing, cleansing or otherwise treating various surfaces to accomplish the end in view more effectually and expeditiously, with greater facility and less expensively than it is now accomplished, and this without in any way marring the finish of the surface being operated upon.

With the above recited and other objects in view, reference is had to the following description and accompanying drawings, in which there is exhibited one example or embodiment of the invention, while the claims define the actual scope of the same.

In the drawings:

Figure 1 is a longitudinal sectional view taken approximately on the line 1—1 of Figure 2, and illustrating the apparatus adapted to the purpose of washing and cleansing the surfaces of an automobile.

Figure 2 is a transverse sectional view taken approximately on the line illustrated at 2—2 in Figure 1, and on a slightly enlarged scale.

Figure 3 is a fragmentary plan view on approximately the same scale as Figure 2.

Figure 4 is a sectional plan view on a slightly enlarged scale, taken approximately on the line illustrated at 4—4 of Figure 1.

Figure 5 is a diagrammatic view illustrating the manner in which the projectile laden fluid is discharged or projected against the surface being treated.

While the apparatus illustrated and hereinafter described is especially designed for the washing and cleansing of the surface of an automobile, it is to be distinctly understood at the outset that this is merely one use or application of the apparatus, which, obviously, may be employed for other various purposes within the scope of the invention.

Referring to the drawings by characters of reference, 10 designates broadly a container or receptacle which is preferably in the nature of a pit or depression, one end of which 11 is deeper than the remainder, for a purpose which will be hereinafter set forth. The container or receptacle 10 is longitudinally subdivided by parallel transversely spaced vertical partitions 12 which terminate at one end at a distance from the end wall 13 of the container or receptacle 10 and which terminate at the opposite end approximately in line with the juncture of the deeper end 11 of the receptacle or container. As illustrated, this divides the receptacle or container into what will be termed an intermediate reservoir 14 which is provided with an end wall 15 separating said reservoir from the deeper end 11 and entirely cutting off communication between said deeper end and the reservoir at this point. The partitions 12 also define between the side walls 16 and the intermediate reservoir 14, passageways 17 and 18 which communicate with the opposite end of the reservoir through a foraminous partition 19. If desired, for insuring the proper directing and circulation, a suitable supplemental baffle wall 20 may be arranged in the container or receptacle 10 at the end wall 13, as clearly illustrated in Figure 4 of the drawings. The passageways 17 and 18, as well as the reservoir 14 and the deeper end 11, contain the surface treating fluid A, which in the present instance will be assumed to be water, although said water may include other ingredients within the scope of the invention. The fluid or water A is arranged in the receptacle to approximately the level indicated in the drawings, namely, slightly below the upper edges 21 of the partitions 12, which edges are in turn disposed an appropriate distance below the upper edge of the receptacle or container 10. Laterally and upwardly inclined baffle walls 22 are disposed between the upper edges 21 of the partitions 12 to a point slightly above and approximately in line with the side walls 16 of the container or receptacle 10. The baffle walls 22 are provided with a foraminous section 23 at their lower portions immediately adjacent the partitions 12. Transversely horizontal longitudinally inclined strainer walls 24 are supported between the side walls 16 of the container or receptacle 10 and the partitions 12 and, preferably, the walls 24 are composed of a fine mesh screen or fabric which will allow for the passage directly therethrough of the fluid only, while preventing the passage of dust, dirt, grease or other foreign matter which falls thereon and moves thereover. In practice, the fine mesh fabric walls 24 may be supported by an underlying foraminous supporting wall 25, which may be of screen or material having a larger mesh. The walls 24 obviously overlie the passageways 17 and 18 and are inclined from the end 13 of the container 10 toward the opposite end where they terminate substantially at the juncture of the deeper end 11 with the main body of the container. Obviously, the lowermost ends of the walls 24 will be disposed slightly above the level of the liquid A.

The pit or container A in the use of the invention illustrated will support by means of transverse beams 30 a pair of longitudinally extending tracks 31 over which the vehicle B to be washed may be run. Preferably, the tracks, as well as the container 10 and other elements disposed above the container, will be housed by a shed or other suitable enclosure 32.

The invention further embraces the use of compressible, absorbent or porous faceted projectiles or pellets C, such as rubber sponges or other equivalents, which are initially arranged in the reservoir 14 and contained by the water or fluid A in said reservoir, and which projectiles are prevented from entering the passageways 17 and 18 by the foraminous wall 19.

The mechanism for withdrawing and projecting the projectile laden fluid or water A from the reservoir 14 consists of an intake conduit 35, the flared inlet mouth 36 of which communicates with the reservoir 14 through the wall 15, and which conduit 35 extends through the fluid contained in the deeper end portion 11 of the container 10 and connects with the inlet 37 of a suitable pump 38, which may be disposed in a supplemental pit or enclosure 39 adjacent the container 10. The pump may be driven by any suitable means, such as a motor 40, and the outlet 41 of the pump has connected therewith a feed conduit or manifold pipe 42 which extends longitudinally of the container and preferably centrally thereof directly below the cross beams 30 which support the track 31. Obviously, the feed conduit or manifold pipe 42 may be supported in any desired manner, such as by U-bolts 43. Tapped into and communicating with the feed conduit or manifold pipe 42 is a plurality of longitudinally spaced outlet pipes 44, each of which is provided with a suitable outlet nozzle 45, the pipes and nozzles being variously arranged and directed to project the projectile laden water or fluid completely over the surfaces of the vehicle B which are to be washed and cleansed. As illustrated, some of the nozzles 45 are disposed under the vehicle and directly outwardly to wash and cleanse the inner sides of the wheels, as well as under the fenders and splash pans.

If desired, the vehicle may be propelled under its own power, but, preferably, in practice, a towing conveyor chain or its equivalent 46 will be provided, which is equipped with one or more hooks 46a for engagement with the axle or other part of the vehicle, and, in practice, the towing conveyor chain 46 will be trained and guided in a suitable guideway 47. In order to baffle and direct the projectile laden fluid after its contact with the under sides of the vehicle to a point where it will gravitate upon the solid portions of the baffle walls 22, transversely inclined baffle walls 48 are provided which extend from the guideway 47 to a point approximately in vertical alignment with the juncture of the foraminous sections 23 with the solid portions of the baffle walls 22. An end baffle wall 49 having a foraminous lower section 50 extends from the end wall 13 downwardly and inwardly to the foraminous wall 19.

Arranged within the deeper end portion 11 is an upper settling basin 55 which is in the nature of a trough extending transversely across this portion of the container, provided with an end wall 56, the upper edge 57 of which is disposed slightly below the level of the fluid A. From the lower opposite upper edge 58, an inclined wall 59 extends uwardly to a point substantially in line with the lowermost edges of the longitudinally inclined strainer walls 24. The bottom wall 60 of the deeper end portion 11 of the container is inclined toward the end wall 61 of the container, and a drain pipe 62 communicates with the lower end portion 11 and is provided with a valve 63 which allows for the draining of the entire receptacle or container.

In operation, the projectile laden fluid or water A is drawn from the reservoir 14 through the intake conduit 35 by means of the pump 38 and forced under pressure through the feed conduit or manifold pipe 42, thence through the various outlet pipes 44 and nozzles 45, thereby forcibly discharging or projecting the fluid A and projectiles C against the surfaces of the vehicle. The projectiles set up a rubbing or buffing action coincident with the impingement of the fluid against the surface and thoroughly cleanse and remove from the surface dust, dirt, mud, grease or other foreign matter. The water or fluid A, together with the projectiles C, gravitates onto the baffle walls 22, and the fluid flows through the interstices of the foraminous sections 23 and 50 onto the strainer walls 24, while the projectiles return directly to the reservoir 14. A considerable proportion of the fluid or water A is strained through the longitudinally inclined strainer walls 24 directly into the passageways 17 and 18, while the dirt, grease or other foreign matter is carried with the remaining portion of the fluid and flows therewith into the deeper end portion 11 of the container or receptacle 10. A considerable proportion of the foreign matter is trapped in the upper settling basin 55, while the remaining fluid and foreign matter which passes over the upper edge 57 enters the compartment defined below the upper settling basin and settles on the bottom wall 60 of the deeper end portion 11, permitting the remaining fluid which has been rid of the foreign matter by the settling action to return to the reservoir through the passageways 17 and then through the foraminous wall 19, where it is again laden or mixed with the projectiles C. It will thus be seen that the operation is continuous and that the water or cleansing fluid, as well as the projectiles C, may be used over and over for a considerable period of time. Periodically, however, the upper settling basin 55 may have the sediment removed and may be cleaned out, and at greater periods of time the entire container 10 may be drained off and the sediment removed from the deeper end 11. If desired, the fluid or water A may be heated by any desired means, but preferably by means of heating pipes 65 arranged in one of the passageways 18 or in any other desired point.

What is claimed is:

1. A surface washing and cleansing apparatus including a reservoir, adapted to contain a cleansing liquid and a multiplicity of relatively solid soft projectiles, means for withdrawing cleansing liquid and projectiles from said reservoir and simultaneously projecting a stream of said cleansing liquid and said projectiles against the surface to be washed and cleansed, means for separating the projectiles from the cleansing liquid after contact with said surface and returning the projectiles directly to the reservoir, means for separating foreign matter from said separated cleansing liquid and means for returning said separated cleansing liquid to the reservoir for reincorporation with the projectiles.

2. In a surface washing apparatus for vehicles, a reservoir over which the vehicle is adapted to be supported, a plurality of discharge nozzles variously directed toward the vehicle surfaces, said reservoir being adapted to contain a supply of cleansing liquid and projectiles, means communicating with said reservoir and the discharge nozzles for withdrawing liquid and projectiles from the reservoir and discharging the same through said nozzles and against the vehicle surfaces, and means overlying the reservoir for receiving said fluid and projectiles, separating the projectiles from the liquid, conveying said liquid away from said reservoir and causing the direct return of the separated projectiles to the reservoir, in combination with means for receiving the liquid conveyed away from the reservoir, separating foreign matter therefrom and returning the said separated liquid to the reservoir for reincorporation and reuse with the projectiles.

3. In an apparatus for washing the surfaces of vehicles with a cleansing medium composed of a liquid and projectiles, which medium is forcibly discharged against the surfaces of the vehicle, a reservoir open at the top and adapted to contain a supply of said liquid and projectiles and over which reservoir the vehicle is supported, means interposed between the under side of the vehicle and the reservoir for gravitationally receiving the projectiles and fluid after contact with the vehicle and for effecting separation of the projectiles and fluid, the conveyance of the fluid away from the reservoir and the return of the separated projectiles to the reservoir, said means comprising a hopper having upwardly and outwardly inclined walls at the upper marginal edges of the reservoir, said walls having strainer portions therein, and a baffle arranged above the reservoir and having oppositely declining portions, the lower edges of which terminate above said inclined walls of the hopper for directing the projectiles and fluids outside of the strainer portions of the hopper walls.

4. In a surface washing apparatus for vehicles, a reservoir over which a vehicle is adapted to be supported, a plurality of discharge nozzles directed toward the various surfaces of the vehicle, said reservoir being adapted to contain a supply of cleansing liquid and projectiles, means for withdrawing liquid and projectiles from the reservoir and effecting forcible discharge of the same through said nozzles against the surfaces of said vehicle, means for effecting temporary separation of the projectiles from the liquid after contact with the vehicle surfaces and returning said projectiles directly to said reservoir for reuse, means for freeing the liquid of foreign matter while separated from the projectiles and means for returning the freed liquid to the reservoir for reuse.

Signed at New York city in the county of New York and State of New York this 19th day of March 1930 A. D.

BERNARD W. TIMONEY.